US012757940B2

(12) United States Patent
Stura

(10) Patent No.: US 12,757,940 B2
(45) Date of Patent: Oct. 13, 2026

(54) INDUCTIVE HEATING DEVICE HAVING A VOLTAGE CONVERTER

(71) Applicant: Philip Morris Products S.A., Neuchatel (CH)

(72) Inventor: Enrico Stura, Palézieux-Village (CH)

(73) Assignee: Philip Morris Products S.A., Neuchatel (CH)

( * ) Notice: Subject to any disclaimer, the term of this patent is extended or adjusted under 35 U.S.C. 154(b) by 555 days.

(21) Appl. No.: 18/550,817

(22) PCT Filed: Mar. 18, 2022

(86) PCT No.: PCT/EP2022/057189
§ 371 (c)(1),
(2) Date: Sep. 15, 2023

(87) PCT Pub. No.: WO2022/195090
PCT Pub. Date: Sep. 22, 2022

(65) Prior Publication Data

US 2024/0172801 A1 May 30, 2024

(30) Foreign Application Priority Data

Mar. 19, 2021 (EP) .................................... 21163767

(51) Int. Cl.
*A24F 40/465* (2020.01)
*H05B 1/02* (2006.01)
(Continued)

(52) U.S. Cl.
CPC ......... *A24F 40/465* (2020.01); *H05B 1/0202* (2013.01); *H05B 6/06* (2013.01); *H05B 6/108* (2013.01)

(58) Field of Classification Search
CPC ........ A24F 40/465; A24F 40/20; A24F 40/50; H05B 1/0202; H05B 6/06; H05B 6/108; H05B 6/105; H02M 3/156; H02M 7/42
See application file for complete search history.

(56) References Cited

U.S. PATENT DOCUMENTS 8,820,330 B2 9/2014 Bellinger et al.
10,524,508 B2 1/2020 Sur et al.
(Continued)

FOREIGN PATENT DOCUMENTS

CN 106163306 A 11/2016
CN 111092537 A 5/2020
(Continued)

OTHER PUBLICATIONS

Combined Chinese Office Action and Search Report issued Mar. 1, 2026, in corresponding Chinese Patent Application No. 202280020526.9 (with English Translation), 18 pages.
(Continued)

*Primary Examiner* — Robert G Bachner
(74) *Attorney, Agent, or Firm* — Oblon, McClelland, Maier & Neustadt, L.L.P.

(57) ABSTRACT

An inductive heating system is provided, including: a first inductive heating device including a first DC power supply configured to provide a first DC supply voltage, and a first heater module including an inductor configured to provide inductive heating, the first heater module having a first heater module input voltage that is substantially equal to the first DC supply voltage; and a second inductive heating device including a second DC power supply configured to provide a second DC supply voltage that is different from the first DC supply voltage, a second heater module including an inductor configured to provide inductive heating, the heater module having the first heater module input voltage, and a
(Continued)

DC/DC voltage converter configured to convert the second DC supply voltage to the first heater module input voltage.

15 Claims, 3 Drawing Sheets

(51) Int. Cl.
*H05B 6/06* (2006.01)
*H05B 6/10* (2006.01)

(56) References Cited

U.S. PATENT DOCUMENTS

| | | | | |
|---|---|---|---|---|
| 2014/0299137 | A1 | 10/2014 | Kieckbusch et al. | |
| 2018/0132531 | A1* | 5/2018 | Sur | H02J 50/12 |
| 2019/0274353 | A1 | 9/2019 | Sur | |
| 2020/0237010 | A1 | 7/2020 | Yamada et al. | |
| 2020/0288783 | A1 | 9/2020 | Sur et al. | |
| 2021/0274851 | A1 | 9/2021 | Nakano et al. | |
| 2022/0183390 | A1 | 6/2022 | Beidelman et al. | |

FOREIGN PATENT DOCUMENTS

| | | | |
|---|---|---|---|
| CN | 211185863 | U | 8/2020 |
| CN | 112385900 | A | 2/2021 |
| EP | 2 170 010 | A2 | 3/2010 |
| EP | 3 760 063 | A1 | 1/2021 |
| JP | 2005-044096 | A | 2/2005 |
| JP | 2010-80356 | A | 4/2010 |
| JP | 2017-516269 | A | 6/2017 |
| JP | 2020-507307 | A | 3/2020 |
| JP | 6811346 | B1 | 1/2021 |
| KZ | 32890 | B | 6/2018 |
| KZ | 32979 | B | 8/2018 |
| RU | 2 643 421 | C2 | 2/2018 |
| RU | 2 645 324 | C2 | 2/2018 |
| RU | 2 719 821 | C2 | 4/2020 |
| RU | 2 739 814 | C1 | 12/2020 |
| RU | 2 741 651 | C1 | 1/2021 |
| WO | WO 2020/035899 | A1 | 2/2020 |
| WO | WO 2020/161650 | A1 | 8/2020 |
| WO | WO 2020/182760 | A1 | 9/2020 |
| WO | WO 2021/001512 | A1 | 1/2021 |
| WO | WO 2021/032809 | A1 | 2/2021 |

OTHER PUBLICATIONS

Combined Russian Office Action and Search Report issued Aug. 6, 2025 in Russian Patent Application No. 2023126524/03 (with English Translation of Office Action only), 9 pages.

Russian Notice of Allowance mailed Dec. 2, 2025, in Russian Patent Application No. 2023126524, 10 pages.

International Search Report & Written Opinion issued Nov. 11, 2022 in PCT/EP2022/057189 filed on Mar. 18, 2022, 19 pages.

Extended European Search Report issued Dec. 8, 2021 in European Patent Application No. 21163767.3, 16 pages.

Sokal, "Class-E RF Power Amplifiers", QEX, Jan./Feb. 2001, pp. 9-20.

Office Action dated Apr. 20, 2026, issued in corresponding Japanese Patent Application No. 2023-555744 (with English translation) (citing documents 1-5).

Office Action dated Jul. 13, 2026 issued in corresponding South Korean Patent Application No. 2023-7035026 (with English translation)(citing document 1).

Office Action dated Jul. 25, 2026 issued in corresponding Chinese Patent Application No. 202280020526.9 (with English translation)(citing documents 1-2).

* cited by examiner

INDUCTIVE HEATING DEVICE HAVING A VOLTAGE CONVERTER

The present disclosure relates to an inductive heating device for heating an aerosol-generating substrate using a susceptor. In particular, but not exclusively, one or more examples of the present disclosure may relate to a handheld, electrically-operated, inductive heating device comprising a heater module and a DC/DC voltage converter. The present disclosure also relates to an inductive heating system comprising a plurality of inductive heating devices and a DC/DC voltage converter.

A number of electrically-operated aerosol-generating devices having an electric heater to heat an aerosol-forming substrate, such as a tobacco plug, have been proposed in the art. An aim of such aerosol-generating devices is to reduce known harmful smoke constituents of the type produced by the combustion and pyrolytic degradation of tobacco in conventional cigarettes. Typically, the aerosol-generating substrate is provided as part of an aerosol-generating article which is inserted into a chamber or cavity in the aerosol-generating device.

In some known devices, to heat the aerosol-forming substrate to a temperature at which it is capable of releasing volatile components that can form an aerosol, a resistive heating element such as a heating blade is inserted into or around the aerosol-forming substrate when the article is received in the aerosol-generating device.

Other aerosol-generating devices use inductive heating rather than resistive heating to heat the aerosol-forming substrate and herein such devices are referred to as "inductive heating devices". Inductive heating devices typically comprise an inductor such as an induction coil which is arranged to be inductively coupled to a conductive susceptor, which susceptor is arranged to be in thermal proximity to the aerosol-forming substrate. The inductor generates a varying magnetic field to generate eddy currents and hysteresis losses in the susceptor, which causes the susceptor to heat up, thereby heating the aerosol-forming substrate.

To help reduce manufacturing complexity, heaters for aerosol-generating devices can be provided as part of heater modules in order to assist with modular assembly. For an inductive heating device, the heater module can comprise the inductor, or connections to the inductor and a driving circuit for powering the inductor in order to generate a varying magnetic field. To achieve accurate heating of the susceptor, the operating parameters of the heater module need to be carefully controlled.

Aerosol-generating devices also require a power supply to operate and, due to the portable nature of aerosol-generating devices, this typically comprises some form of battery. Lithium ion batteries are a popular choice of battery for aerosol-generating devices due to their high energy density. However, there are a number of different types of lithium ion battery having different battery chemistries which affects the properties of the battery, in particular, the output or supply voltage of the battery. For example, lithium iron phosphate ($LiFePO_4$ or LFP) batteries typically have an output voltage of between 3.7 Volts (which is the maximum charge voltage) and 2.5 Volts (which is the minimum discharge voltage), where the typical output voltage in an LFP battery's operating range is between 3.2V and 3.0V. On the other hand, lithium nickel manganese cobalt oxide ($LiNiMnCoO_2$ or NMC) batteries typically have a typical output voltage of around 4.2 Volts.

Generally, manufacturers will design their aerosol-generating device, and the control electronics of such devices, to work with a particular supply voltage which is dependent on the type of battery chemistry they select. Certain components or circuits within the device may be very sensitive to the nominated supply voltage and may not work with other battery chemistries having different supply voltages. This can be problematic in a modular system in which particular components or circuits of the aerosol-generating device are incorporated into modules because it may prevent a module designed for one battery chemistry being used with an aerosol-generating device having a different battery chemistry. Indeed, the use of such a module with a battery chemistry it was not designed to use may result in undesirable behaviour.

It would be desirable to provide an inductive heating device which can work with different battery chemistries. It would be desirable to provide an inductive heating system which can work with different battery chemistries.

According to an example of the present disclosure, there is provided an inductive heating device for heating an aerosol-generating substrate using a susceptor. The inductive heating device may comprise a DC power supply for providing a DC supply voltage. The inductive heating device may comprise a heater module. The heater module may comprise an inductor arranged to inductively couple to the susceptor. The heater module may comprise a DC/AC voltage converter comprising or connected to the inductor. The DC/AC converter may be configured to convert a heater module input voltage to an AC voltage for driving the inductor. The inductive heating device may further comprise a DC/DC voltage converter configured to convert the DC supply voltage to the heater module input voltage.

According to an example of the present disclosure, there is provided an inductive heating device for heating an aerosol-generating substrate using a susceptor. The inductive heating device comprising: a DC power supply for providing a DC supply voltage; a heater module comprising: an inductor arranged to inductively couple to the susceptor; a DC/AC voltage converter comprising or connected to the inductor and configured to convert a heater module input voltage to an AC voltage for driving the inductor; the inductive heating device further comprising a DC/DC voltage converter configured to convert the DC supply voltage to the heater module input voltage.

Advantageously, the use of a DC/DC voltage converter allows power supplies having different battery chemistries to be used with the heater module. The DC/DC voltage converter can convert the output or supply voltage provided by the power supply to the input voltage required by the heater module so that the heater module can operate correctly. This allows the same heater module to be used in a range of devices which may have different supply voltages. This reduces manufacturing complexity and avoids the need to design a bespoke heater module for each specific battery used to power the heater module in each device.

Another advantage of using a DC/DC voltage converter is that it helps to improve the operating stability of the heater module by providing a constant input voltage to the heater module. A number of the components and operating parameters of the heater module are voltage dependent and the use different battery chemistries can result in certain components of the heater module experiencing different voltages which maybe outside their operating range. Furthermore, as batteries are used and their charge is gradually exhausted, the output or supply voltage of the battery may reduce. Although the discharge voltage of batteries remains relatively constant across their operating range, there can be some variation which can effect voltage sensitive components and systems. Therefore, the DC/DC voltage converter helps to keep the voltage supplied to the heater module constant for consistent operation.

A further advantage of using a DC/DC voltage converter is that it provides a constant output voltage which can be used as a voltage reference, for example, for use with sensors, analogue to digital converters and the determination of characteristics such as electrical power. For example, if the heat module input voltage is constant and known, then only current needs to be determined in order to calculate the electrical power the heater module is drawing.

As used herein, the term "inductive heating device" refers to an aerosol-generating device which uses inductive heating to heat an aerosol-forming substrate.

As used herein, the term "module" refers to a part or subset of a larger device or electrical circuit. A module may comprise a collection of related components that are grouped or connected together and arranged for interconnection with other parts of the device or other modules. The module can be a standalone part such as a separate printed circuit board or it can be part of a larger component or circuit, for example, a larger printed circuit board.

As used herein, the term "susceptor" refers to an element comprising a material that is capable of converting electromagnetic energy into heat. When a susceptor is located in a varying magnetic field, such as the varying magnetic field generated by an inductor, the susceptor is heated. Heating of the susceptor may be the result of at least one of hysteresis losses and eddy currents induced in the susceptor, depending on the electrical and magnetic properties of the susceptor material.

As used herein, the terms "distal" and "proximal" are used to describe the relative position of components in relation to a user. The term "distal" refers to a position more distant or away from a user and the term "proximal" refers to a position nearer or towards a user.

The DC/DC voltage converter may be part of the heater module. This helps to reduce the number of separate components in the inductive heating device and also ensures that the heater module will always receive the correct input voltage because any supply voltage connected to the heater module will be converted to the correct constant heater module input voltage. In other examples, the DC/DC voltage converter may be a separate module or unit.

The heater module input voltage may be in the range between 1 Volt and 9 Volts, preferably between 2 Volts and 6 Volts and more preferably between 2.5 Volts and 5.5 Volts. The heater module input voltage may be 2.95 Volts.

The heater module input voltage may be less than the DC supply voltage. The DC/DC voltage converter may be a step-down voltage converter. For example, the DC/DC voltage converter may be a buck converter. The heater module input voltage may be more than the DC supply voltage. The DC/DC voltage converter may be a step-up voltage converter. For example, the DC/DC voltage converter may be a boost converter. The DC/DC voltage converter may be a step-up or step-down voltage converter. For example, the DC/DC voltage converter may be a buck-boost converter.

The DC/DC voltage converter may be configured to accept a range of DC supply voltages. The DC/DC voltage converter may be configured to accept a DC supply voltage in the range between 1 Volt and 9 Volts, preferably between 2 Volts and 6 Volts and more preferably between 2.4 Volts and 5.5 Volts. The DC/DC voltage converter may be configured to output a constant heater module input voltage.

The DC/DC voltage converter may be a switched mode voltage converter. An output voltage of the DC/DC voltage converter may be related to a duty cycle of a switching signal generated or received by the DC/DC voltage converter. Using a switching signal having a duty cycle provides a simple way of controlling the output voltage from the DC/DC voltage converter and the heater module input voltage.

The DC/DC voltage converter may comprise a first switching element. The first switching element may be configured to be activated during a first part of the switching signal. The first switching element may be a bipolar-junction transistor (BJT). The first switching element may be a field effect transistor (FET), such as a metal-oxide-semiconductor field effect transistor (MOSFET) or a metal-semiconductor field effect transistor (MESFET). Preferably, the first switching element is a MOSFET. MOSFETs have low resistance when activated or turned on which helps to reduce power losses.

The DC/DC voltage converter may comprise a second switching element. The second switching element may be configured to be activated during a second part of the switching signal. The second switching element may be diode. The second switching element may be a bipolar-junction transistor (BJT). The second switching element may be a field effect transistor (FET), such as a metal-oxide-semiconductor field effect transistor (MOSFET) or a metal-semiconductor field effect transistor (MESFET). Preferably, the second switching element is a MOSFET.

The second switching element may deactivated when the first switching element is activated and the first switching element may be deactivated when the second switching element is activated. This helps to prevent a short circuit between the DC supply voltage and electrical ground, which is undesirable.

The DC/DC voltage converter may comprise a controller for generating the switching signal. The controller may be configured to generate a first switching signal for the first switching element. The controller may be configured to generate a second switching signal for the second switching element. The second switching signal may be the inverse of the first switching signal. Inverting the second switching signal prevents the second switching element from being activated or turned on at the same time as the first switching element. As discussed above, this helps to prevent a short circuit between the DC supply voltage and electrical ground. The controller may comprise logic for inverting the second switching signal.

The first and second switching elements may be arranged in a half-bridge arrangement. A half-bridge arrangement allows each of the first and second switching elements to be alternately connected to the same load.

The DC/DC voltage converter may comprises a comparator configured to compare an output voltage of the DC/DC voltage converter to a reference voltage. The comparator may be configured to generate an output signal for adjusting the duty cycle of the switching signal based on the comparison. This allows the duty cycle to be either increased or decreased to correct the output voltage to a predetermined voltage, for example, the heater module input voltage. The output signal from the comparator may be sent to a controller of the DC/DC voltage converter to adjust the duty cycle.

The controller, comparator and first and second switching elements of the DC/DC voltage converter may be combined as an integrated circuit. This arrangement means that the only additional components required to implement the DC/DC voltage converter are an inductor and a capacitor.

This helps to reduce part count and the printed circuit board area required and hence the overall size of the inductive heating device.

The inductive heating device may be configured to determine a temperature of the susceptor by determining a resistance or conductance of the susceptor based on a measured current supplied by the DC power supply or DC/DC voltage converter to the heater module. This has been found to be convenient and accurate method for determining the temperature of the susceptor which is otherwise difficult to measure because the susceptor is not part of the heater module circuit. Furthermore, it is difficult to arrange a temperature sensor in sufficient proximity to the susceptor because the susceptor is embedded in the aerosol-forming substrate and may be part of the aerosol-generating article rather than the inductive heating device. Determining a resistance or conductance of the susceptor based on a measured current supplied by the DC power supply or DC/DC voltage converter to the heater module negates the need for a dedicated temperature sensor.

The inductive heating device may comprise a DC current sensor for measuring a current supplied by the DC power supply or the DC/DC voltage converter. The current sensor may comprise a resistor. The resistor may be arranged in series with the circuit for driving and powering the inductor.

The inductive heating device may comprise a DC voltage sensor for measuring a DC voltage supplied by the DC power supply or the DC/DC voltage converter. The DC voltage sensor may comprise a voltage or potential divider. The voltage divider may comprise two resistors. Each of the two resistors may have an equal value.

The aforementioned inductor may comprise a first inductor and the inductive heating device may comprise a second inductor. The second inductor may be arranged at an input to drive circuitry for the first inductor. The second inductor may be connected in series with a transistor. The second inductor may comprise a radio frequency choke.

The inductive heating device may be configured to interrupt generation of, or turn OFF, the AC voltage when the determined temperature of the susceptor exceeds or equals a predetermined threshold value. The inductive heating device may be configured to activate generation of, or turn ON, the AC voltage when the determined temperature of the susceptor is less than a predetermined threshold value. This provides a simply ON/OFF controller for controlling the temperature of the susceptor.

The DC power supply is configured to supply a DC supply voltage and a DC current. The DC power supply may be any suitable DC power supply. For example, the DC power supply may be a single use battery or a rechargeable battery. In some examples, the DC power supply may comprise a lithium ion battery. For example, the DC power supply may comprise a lithium polymer battery, a lithium iron phosphate ($LiFePO_4$) battery, a lithium manganese oxide ($LiMn_2O_4$ or $Li_2MnO_3$) battery, a lithium nickel manganese cobalt oxide ($LiNiMnCoO_2$ or NMC) battery or a lithium-titanate-oxide (LTO) battery. In other examples, the DC power supply may comprise a nickel-metal hydride battery or a nickel cadmium battery. In some examples, the DC power supply may comprise one or more capacitors, super capacitors or hybrid capacitors. The DC power supply may comprise one or more lithium ion hybrid capacitors.

The DC power supply may have a capacity that allows for the storage of enough energy for one or more user operations. For example, the power supply may have sufficient capacity to allow for continuous heating of an aerosol-forming substrate for a period of around six minutes, corresponding to the typical time taken to smoke a conventional cigarette, or for a period that is a multiple of six minutes. In another example, the power supply may have sufficient capacity to allow for a predetermined number of puffs or discrete activations of the inductive heating device. In another example, the power supply may have sufficient capacity to allow for a predetermined number of uses of the device or discrete activations.

The DC supply voltage may be in the range between about 1 Volt and about 9 Volts, preferably between about 2 Volts and about 6 Volts and more preferably between about 2.4 Volts and about 5.5 Volts. The DC supply voltage may be about 3.2 Volts or about 3.6 Volts or about 4.2 Volts. In one example, the DC power supply has a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The inductive heating device may comprise drive circuitry for driving the inductor or DC/AC voltage converter. The drive circuitry may comprise a transistor. The drive circuitry may be configured to receive a switching signal and to drive the DC/AC voltage converter based on the switching signal.

The DC/AC voltage converter may comprise the inductor. This helps to reduce the number of components required by the heater module.

The DC/AC converter may be configured to operate at high frequency. As used herein, the term "high frequency" is used to describe a frequency ranging from about 1 Megahertz (MHz) to about 30 Megahertz (MHZ), from about 1 Megahertz (MHz) to about 10 MHZ (including the range of about 1 MHz to about 10 MHZ), and from about 5 Megahertz (MHz) to about 7 Megahertz (MHZ) (including the range of about 5 MHz to about 7 MHZ).

The DC/AC voltage converter may comprise an LC (inductor capacitor) load network. The LC load network may be configured to operate at low ohmic load. The LC load network may comprise the inductor and a capacitor connected in series with the inductor. The LC load network may comprise a shunt capacitor. The capacitors may be tuned or configured to reduce the ohmic resistance of the inductor. The capacitor connected in series may comprise a plurality of capacitors. The shunt capacitor may comprises a plurality of capacitors.

The DC/AC voltage converter may comprise a resonator comprising the inductor and a series capacitor. The resonator may act as a bandpass filter for allowing only predetermined range of frequencies to pass through the DC/AC voltage converter. The predetermined range of frequencies may comprise the frequency of a switching signal provided to drive circuitry of the inductive heating device.

The heater module may comprise a power amplifier for powering the inductor. The power amplifier may comprise a Class-E power amplifier. Class-E power amplifiers have very high efficiencies compared to other classes of power amplifier and only require a single switching element or transistor.

The inductor may comprise a coil. The coil may be a helically wound cylindrical inductor coil. In some examples, the inductor coil may have an oblong shape and define an inner volume in the range of about 0.15 $cm^3$ to about 1.10 $cm^3$. For example, the inner diameter of the helically wound cylindrical inductor coil may be between about 5 mm and about 10 mm or about 7 mm, and the length of the helically wound cylindrical inductor coil may be between about 8 mm and about 14 mm. The diameter or the thickness of the inductor coil wire may be between about 0.5 mm and about 1 mm, depending on whether a coil wire with a circular cross-section or a coil wire with a flat rectangular cross-section is used. The inductor coil may be positioned on or adjacent the internal surface of a cavity of the inductive heating device for receiving an aerosol-generating article. The coil may surround the cavity. The inductor may comprise one coil or more than one coil.

The inductive heating device may comprise a susceptor. The susceptor may comprise any suitable material. The susceptor may be formed from any material that can be inductively heated to a temperature sufficient to release volatile compounds from the aerosol-forming substrate. Preferred susceptors may be heated to a temperature in excess of about 250 degrees Celsius. Preferred susceptors may be formed from an electrically conductive material. Suitable materials for a susceptor include graphite, molybdenum, silicon carbide, stainless steels, niobium, aluminium, nickel, nickel containing compounds, titanium, and composites of metallic materials. Preferred susceptors comprise a metal or carbon. Some preferred susceptors comprise a ferromagnetic material, for example, ferritic iron, a ferromagnetic alloy, such as ferromagnetic steel or stainless steel, ferromagnetic particles, and ferrite. Some preferred susceptors consists of a ferromagnetic material. A suitable susceptor may comprise aluminium. A suitable susceptor may consist of aluminium. A susceptor may comprise at least about 5 percent, at least about 20 percent, at least about 50 percent or at least about 90 percent of ferromagnetic or paramagnetic materials.

The susceptor of the inductive heating device may have any suitable form. For example, the susceptor may be elongate. The susceptor may have any suitable transverse cross-section. For example, the susceptor may have a circular, elliptical, square, rectangular, triangular or other polygonal transverse cross-section. The susceptor may be tubular.

In some preferred embodiments, the susceptor may comprise a susceptor layer provided on a support body. Arranging the susceptor in a varying magnetic field induces eddy currents in close proximity to the susceptor surface, in an effect that is referred to as the skin effect. Accordingly, it is possible to form a susceptor from a relatively thin layer of susceptor material, while ensuring the susceptor is effectively heated in the presence of a varying magnetic field. Making a susceptor from a support body and a relatively thin susceptor layer may facilitate manufacture of an aerosol-generating article that is simple, inexpensive and robust.

Where the susceptor is a tubular susceptor, the tubular susceptor may at least partially define a cavity for receiving the aerosol-generating article or aerosol-forming substrate. When the susceptor comprises a support body, the support body may be a tubular support body and the susceptor layer may be provided on an internal surface of the tubular support body. Providing the susceptor layer on the internal surface of the support body may position the susceptor layer adjacent an aerosol-generating article or aerosol-forming substrate in a cavity for receiving the aerosol-generating article or aerosol-forming substrate, improving heat transfer between the susceptor layer and the aerosol-forming substrate.

The support body may be formed from a material that is not susceptible to inductive heating. Advantageously, this may reduce heating of surfaces of the susceptor that are not in contact with an aerosol-forming substrate, where surfaces of the support body form surfaces of the susceptor that are not in contact with an aerosol-forming substrate.

The support body may comprise an electrically insulative material. As used herein, "electrically insulating" refers to materials having an electrical resistivity of at least $1\times10^4$ ohm metres (Ωm), at twenty degrees Celsius.

Forming the support body from a thermally insulative material may provide a thermally insulative barrier between the susceptor layer and other components of an inductive heater assembly, such as an inductor coil circumscribing the susceptor. Advantageously, this may reduce heat transfer between the susceptor and other components of the inductive heating device.

The thermally insulative material may also have a bulk thermal diffusivity of less than or equal to about 0.01 square centimetres per second ($cm^2/s$) as measured using the laser flash method. Providing a support body having such a thermal diffusivity may result in a support body with a high thermal inertia, which may reduce heat transfer between the susceptor layer and the support body, and reduce variations in the temperature of the support body.

The susceptor may have any suitable dimensions. The susceptor may have a length of between about 5 millimetres and about 15 millimetres, for example between about 6 millimetres and about 12 millimetres, or between about 8 millimetres and about 10 millimetres. The susceptor may have a width of between about 1 millimetre and about 8 millimetres, for example between about 3 millimetres and about 5 millimetres. The susceptor may have a thickness of between about 0.01 millimetres and about 2 millimetres. Where the susceptor has a constant cross-section, for example a circular cross-section, the susceptor may have a preferable width or diameter of between about 1 millimetre and about 5 millimetres.

The inductive heating device may comprise at least one external heating element. The at least one external heating element may comprise the susceptor. As used herein, the term "external heating element" refers to a heating element configured to heat an outer surface of an aerosol-forming article or substrate. The at least one external heating element may at least partially circumscribe a cavity for receiving the aerosol-generating article or aerosol-forming substrate.

The inductive heating device may comprise at least one internal heating element. The internal heating element may comprise the susceptor. As used herein, the term "internal heating element" refers to a heating element configured to be inserted into an aerosol-forming substrate. The internal heating element may be in the form of a blade, a pin, and a cone. The at least one internal heating element may extend into a cavity for receiving the aerosol-generating article or aerosol-forming substrate.

In some embodiments, the inductive heating device comprises at least one internal heating element, and at least one external heating element.

The inductive heating device may comprise one or more of the above-described susceptors.

The inductive heating device may comprise a device housing. The device housing may at least partially define a cavity for receiving an aerosol-generating article or aerosol-forming substrate. Preferably the cavity for receiving an aerosol-generating article or aerosol-forming substrate is at a proximal end of the device.

The device housing may be elongate. Preferably, the device housing is cylindrical in shape. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

Preferably, the inductive heating device is portable. The inductive heating device may have a size comparable to a conventional cigar or cigarette. The inductive heating device may have a total length between about 30 millimetres and about 150 millimetres. The inductive heating device may have an external diameter between about 5 millimetres and about 30 millimetres. The inductive heating device may be a handheld device. In other words, the inductive heating device may be sized and shaped to be held in the hand of a user.

The aerosol-generating device may comprise control circuitry or a controller connected to the at least one inductor coil and the power supply. The control circuitry may be configured to control the supply of power to the at least one inductor coil from the power supply. The control circuitry may comprise a microprocessor, which may be a programmable microprocessor, a microcontroller, or an application specific integrated chip (ASIC) or other electronic circuitry capable of providing control. The control circuitry may comprise further electronic components. The control circuitry may be configured to regulate a supply of current to the at least one inductor coil. Current may be supplied to the at least one inductor coil continuously following activation of the aerosol-generating device or may be supplied intermittently, such as on a puff by puff basis.

The control circuitry may comprise a first microcontroller and the heater module may comprise a second microcontroller. The second microcontroller may be part of the heater module and dedicated to controlling operation of the heater module and, in particular, the supply of electrical power to the inductor. The second microcontroller may be connected to the first microcontroller 202. The second microcontroller may control the supply of electrical power to the inductor in response to a signal received from the first microcontroller. An advantage of the heater module having its own microcontroller is that it helps make the heater module reusable in different devices because it can be programmed with its own firmware for controlling the heating process and there is no need to include firmware relating to heating in other components such as the first microcontroller. This helps make the heater module a standalone unit or module which can be integrated into various different devices.

The inductive heating device may include a user interface to activate the device, for example a button to initiate heating of an aerosol-generating article. The inductive heating device may comprise a display to indicate a state of the device or of the aerosol-forming substrate. The inductive heating device may comprise a sensor for detecting when user takes a puff on an aerosol-generating article.

The inductive heating device of the present disclosure is configured to heat an aerosol-forming substrate. As used herein, the term "aerosol-forming substrate" relates to a substrate capable of releasing volatile compounds that may form an aerosol. Such volatile compounds may be released by heating the aerosol-forming substrate.

The aerosol-forming substrate may comprise nicotine. The nicotine-containing aerosol-forming substrate may be a nicotine salt matrix.

The aerosol-forming substrate may be a liquid. The aerosol-forming substrate may comprise solid components and liquid components. Preferably, the aerosol-forming substrate is a solid.

The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. The aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate comprises a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers may include polyhydric alcohols or mixtures thereof, such as triethylene glycol, 1,3-butanediol. Preferably, the aerosol former is glycerine. Where present, the homogenised tobacco material may have an aerosol-former content of equal to or greater than 5 percent by weight on a dry weight basis, such as between about 5 percent and about 30 percent by weight on a dry weight basis. The aerosol-forming substrate may comprise other additives and ingredients, such as flavourants.

The aerosol-forming substrate may be part of an aerosol-generating article. As used herein, the term "aerosol-generating article" refers to an article comprising an aerosol-forming substrate that, when heated in the inductive heating device, releases volatile compounds that can form an aerosol. An aerosol-generating article is separate from and configured for combination with the inductive heating device for heating the aerosol-generating article.

The aerosol-generating article may be in the form of a rod that comprises two ends: a mouth end, or proximal end, through which aerosol exits the aerosol-generating article and is delivered to a user, and a distal end. In use, a user may draw on the mouth end in order to inhale aerosol generated by the aerosol-generating article. The mouth end is downstream of the distal end. The distal end may also be referred to as the upstream end and is upstream of the mouth end.

As used herein, the terms 'upstream' and 'downstream' are used to describe the relative positions of elements, or portions of elements, of the aerosol-generating article in relation to the direction in which a user draws on the aerosol-generating article during use thereof.

The aerosol-generating article may have any suitable form. The aerosol-generating article may be substantially cylindrical in shape. The aerosol-generating article may be substantially elongate.

In some preferred examples, the aerosol-generating article may have a total length between about 30 millimetres and about 100 millimetres. In some embodiments, the aerosol-generating article has a total length of about 45 millimetres. The aerosol-generating article may have an outer diameter between about 5 millimetres and about 12 millimetres. In some embodiments, the aerosol-generating article may have an outer diameter of about 7.2 millimetres.

The aerosol-forming substrate may be provided as an aerosol-generating segment containing an aerosol-forming substrate. The aerosol-generating segment may have a length of between about 7 millimetres and about 15 millimetres. In some embodiments, the aerosol-generating segment may have a length of about 10 millimetres, or 12 millimetres.

The aerosol-generating segment preferably has an outer diameter that is about equal to the outer diameter of the aerosol-generating article. The outer diameter of the aerosol-generating segment may be between about 5 millimetres and about 12 millimetres. In one embodiment, the aerosol-generating segment may have an outer diameter of about 7.2 millimetres.

The aerosol-generating article may comprise a susceptor. The susceptor may be arranged in thermal proximity to the aerosol-forming substrate. Thus, when the susceptor heats up, the aerosol-forming substrate is heated up and an aerosol is formed. The susceptor may be arranged in direct or intimate physical contact with the aerosol-forming substrate, for example within the aerosol-forming substrate.

The susceptor may comprise any suitable material. The susceptor may be formed from any material that can be inductively heated to a temperature sufficient to release volatile compounds from the aerosol-forming substrate. Preferred susceptors may be heated to a temperature in excess of about 250 degrees Celsius. Preferred susceptors may be formed from an electrically conductive material. Suitable materials for a susceptor include graphite, molybdenum, silicon carbide, stainless steels, niobium, aluminium, nickel, nickel containing compounds, titanium, and composites of metallic materials. Preferred susceptors comprise a metal or carbon. Some preferred susceptors comprise a ferromagnetic material, for example, ferritic iron, a ferromagnetic alloy, such as ferromagnetic steel or stainless steel, ferromagnetic particles, and ferrite. Some preferred susceptors consists of a ferromagnetic material. A suitable susceptor may comprise aluminium. A suitable susceptor may consist of aluminium. A susceptor may comprise at least about 5 percent, at least about 20 percent, at least about 50 percent or at least about 90 percent of ferromagnetic or paramagnetic materials.

The susceptor may be in the form of a pin, rod, or blade. The susceptor may have a length of between about 5 mm and about 15 mm, between about 6 mm and about 12 mm or between about 8 mm and about 10 mm. The susceptor may have a width of between about 1 mm and about 6 mm and may have a thickness of between about 10 micrometres and about 500 micrometres or between about 10 and 100 about micrometres. If the susceptor has a constant cross-section, for example a circular cross-section, it may have a width or diameter of between about 1 mm and about 5 mm.

The susceptor may have a length dimension that is greater than its width dimension or its thickness dimension, for example greater than twice its width dimension or its thickness dimension. Thus the susceptor may be described as an elongate susceptor. The susceptor may be arranged substantially longitudinally within the rod. This means that the length dimension of the elongate susceptor is arranged to be about parallel to the longitudinal direction of the rod, for example within plus or minus 10 degrees of parallel to the longitudinal direction of the rod. The elongate susceptor element may be positioned in a radially central position within the rod, and extend along the longitudinal axis of the rod.

In some embodiments, the aerosol-generating article may contain a single susceptor. In other embodiments, the aerosol-generating article may comprise more than one susceptor. The aerosol-generating article may have more than one elongate susceptor. Thus, heating may be efficiently effected in different portions of the aerosol-forming substrate.

In some preferred embodiments, the susceptor comprises a first susceptor material and a second susceptor material. The first susceptor material may be disposed in thermal proximity to the second susceptor material. The first susceptor material may be disposed in intimate physical contact with the second susceptor material.

The aerosol-generating article may comprise a mouthpiece filter. The mouthpiece filter may be located at a proximal end of the aerosol-generating article. The mouthpiece filter plug may be a cellulose acetate filter plug. In some examples, the mouthpiece filter may have a length of about 5 millimetres to about 10 millimetres. In some preferred examples, the filter plug may have a length of about 7 millimetres.

The aerosol-generating article may comprise one or more hollow tubes. The aerosol-generating article may comprise two hollow tubes. The hollow tubes may be made from cellulose acetate.

The aerosol-generating article may comprise an end plug. The end plug may be arranged at a distal end of the aerosol-generating article. The end plug helps to prevent a user from contacting the heated susceptor at any time, for example, after use.

The aerosol-generating article may comprise an outer wrapper. The outer wrapper may be formed from paper. The outer wrapper may be gas permeable at the aerosol-generating segment. This may improve the characteristics of the aerosol generated from the aerosol-forming substrate.

According to an example of the present disclosure, there is provided an inductive heating system comprising a first inductive heating device. The first inductive heating device may comprise a first DC power supply for providing a first DC supply voltage. The first inductive heating device may comprise a first heater module. The first hater module may comprise an inductor for providing inductive heating. The first heater module may have a first heater module input voltage. The first heater module input voltage may be substantially equal to the first DC supply voltage. The inductive heating system may comprise a second inductive heating device. The second inductive heating device may comprise a second DC power supply for providing a second DC supply voltage. The second DC power supply may be different to the first DC supply voltage. The second inductive heating device may comprise a second heater module. The second heater module may comprise an inductor for providing inductive heating. The second heater module may have the first heater module input voltage. The second inductive heating device may comprise a DC/DC voltage converter for converting the second DC supply voltage to the first heater module input voltage.

According to an example of the present disclosure, there is provided an inductive heating system comprising: a first inductive heating device comprising: a first DC power supply for providing a first DC supply voltage; and a first heater module comprising an inductor for providing inductive heating, the first heater module having a first heater module input voltage which is substantially equal to the first DC supply voltage; a second inductive heating device comprising: a second DC power supply for providing a second DC supply voltage that is different to the first DC supply voltage; a second heater module comprising an inductor for providing inductive heating, the heater module having the first heater module input voltage; and a DC/DC voltage converter for converting the second DC supply voltage to the first heater module input voltage.

The first heater module input voltage may be less than the second DC supply voltage. The DC/DC voltage converter may be a step-down voltage converter. The DC/DC voltage converter may be a buck converter. The first heater module input voltage may be more than the second DC supply voltage. The DC/DC voltage converter may be a step-up voltage converter. The DC/DC voltage converter may be a boost converter. The DC/DC voltage converter may be a step-up or step-down voltage converter. The DC/DC voltage converter may be a buck-boost converter.

The first and second inductive heating devices of the inductive heating system may comprise any of the above-described inductive heating devices and heater modules.

Features described in relation to one of the above examples may equally be applied to other examples of the present disclosure.

The invention is defined in the claims. However, below there is provided a non-exhaustive list of non-limiting examples. Any one or more of the features of these examples may be combined with any one or more features of another example, embodiment, or aspect described herein.

Example Ex1: An inductive heating device for heating an aerosol-generating substrate using a susceptor, the inductive heating device comprising: a DC power supply for providing a DC supply voltage; a heater module comprising an inductor arranged to inductively couple to the susceptor, the heater module having a heater module input voltage; the inductive heating device further comprising a DC/DC voltage converter configured to convert the DC supply voltage to the heater module input voltage.

Example Ex2: An inductive heating device according to example Ex1, wherein the heater module further comprises a DC/AC voltage converter comprising or connected to the inductor and configured to convert a heater module input voltage to an AC voltage for driving the inductor Example Ex3: An inductive heating device according to example Ex 1 or 2, wherein the DC/DC voltage converter is part of the heater module.

Example Ex4: An inductive heating device according to any of examples Ex1 to Ex3, wherein the heater module input voltage is less than the DC supply voltage and the DC/DC voltage converter is a step-down voltage converter.

Example Ex5: An inductive heating device according to any of examples Ex1 to Ex4, wherein the DC/DC voltage converter is configured to accept a range of DC supply voltages and output a constant heater module input voltage.

Example Ex6: An inductive heating device according to any of examples Ex1 to Ex5, wherein an output voltage of the DC/DC voltage converter is related to a duty cycle of a switching signal generated or received by the DC/DC voltage converter.

Example Ex7: An inductive heating device according to any of examples Ex1 to Ex6, wherein the DC/DC voltage converter comprises a first switching element which is configured to be activated during a first part of the switching signal.

Example Ex8: An inductive heating device according to example Ex7, wherein the DC/DC voltage converter comprises a second switching element which is configured to be activated during a second part of the switching signal.

Example Ex9: An inductive heating device according to example Ex8, wherein the second switching element is deactivated when the first switching element is activated and the first switching element is deactivated when the second switching element is activated.

Example Ex10: An inductive heating device according to example Ex8 or Ex9, wherein the first and second switching elements are arranged in a half-bridge arrangement.

Example Ex11: An inductive heating device according to any of examples Ex1 to Ex10, wherein the DC/DC voltage converter comprises a comparator configured to compare an output voltage of the DC/DC voltage converter to a reference voltage and to generate an output signal for adjusting the duty cycle of the switching signal based on the comparison.

Example Ex12: An inductive heating device according to any of examples Ex8 to Ex11, wherein the DC/DC voltage converter comprises a converter driver for driving the first and second switching elements based on the switching signal.

Example Ex13: An inductive heating device according to any of examples Ex1 to Ex12, wherein the inductive heating device is configured to determine a temperature of the susceptor by determining a resistance or conductance of the susceptor based on a measured current supplied by the DC power supply or DC/DC voltage converter to the heater module.

Example Ex14: An inductive heating device according to example Ex13, further comprising a DC current sensor for measuring a current supplied by the DC power supply.

Example Ex15: An inductive heating device according to example Ex14, wherein the DC current sensor comprises a resistor.

Example Ex16: An inductive heating device according to example Ex13 or Ex14, further comprising a DC voltage sensor for measuring a DC voltage of the DC power supply.

Example Ex17: An inductive heating device according to any of examples Ex13 to Ex16, wherein the DC voltage sensor comprises a potential divider.

Example Ex18: An inductive heating device according to any of examples Ex1 to Ex17, wherein the DC/AC voltage converter comprise an LC load network configured to operate at low ohmic load.

Example Ex19: An inductive heating device according to example Ex18, wherein the LC load network comprises the inductor and a capacitor connected in series with the inductor.

Example Ex20: An inductive heating device according to example Ex18 or Ex19, wherein the LC load network comprises a shunt capacitor.

Example Ex21: An inductive heating device according to example Ex19 or Ex20, wherein one or more of the series capacitor or the shunt capacitor are tuned or configured to reduce the ohmic resistance of the inductor.

Example Ex22: An inductive heating device according to any of examples Ex19 to Ex21, wherein the series capacitor comprises a plurality of capacitors.

Example Ex23: An inductive heating device according to any of examples Ex20 to Ex22, wherein the shunt capacitor comprises a plurality of capacitors.

Example Ex24: An inductive heating device according to any of examples Ex19 to Ex23, wherein the inductor and series capacitor form a resonator which acts as a bandpass filter for allowing only predetermined range of frequencies to pass through the DC/AC voltage converter.

Example Ex25: An inductive heating device according to example Ex24, wherein the predetermined range of frequencies comprises the frequency of a switching signal provided to DC/AC voltage converter.

Example Ex26: An inductive heating device according to any of examples Ex13 to Ex25, wherein the inductive heating device is configured to interrupt generation of the AC voltage when the determined temperature of the susceptor exceeds or equals a predetermined threshold value.

Example Ex27: An inductive heating system comprising: a first inductive heating device comprising: a first DC power supply for providing a first DC supply voltage; and a first heater module comprising an inductor for providing inductive heating, the first heater module having a first heater module input voltage which is substantially equal to the first DC supply voltage; a second inductive heating device comprising: a second DC power supply for providing a second DC supply voltage that is different to the first DC supply voltage; a second heater module comprising an inductor for providing inductive heating, the heater module having the first heater module input voltage; and a DC/DC voltage converter for converting the second DC supply voltage to the first heater module input voltage.

Example Ex28: A system according to example Ex27, wherein the first heater module input voltage is less than the second DC supply voltage and the DC/DC voltage converter is a step-down voltage converter.

Examples will now be further described with reference to the figures in which.

Figure 1:
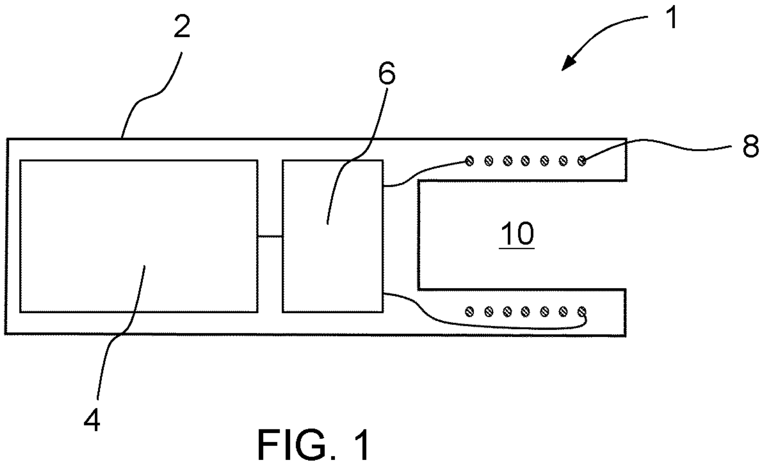
FIG. 1 is a schematic longitudinal cross-section of an inductive heating device according to an example of the present disclosure.
Figure 2:
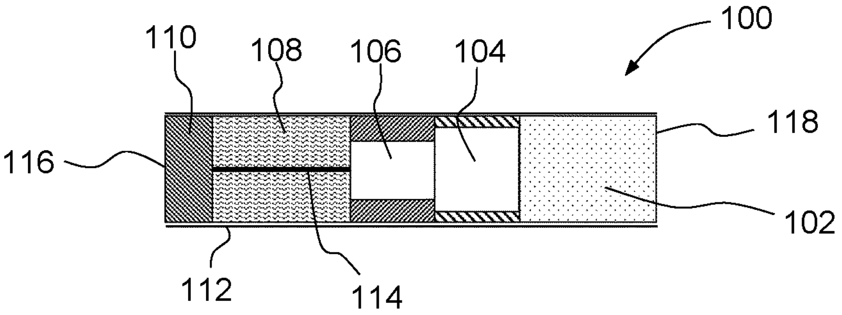
FIG. 2 is a schematic longitudinal cross-section of an aerosol-generating article for use with the inductive heating device of FIG. 1.

Referring to FIG. 1, this shows a schematic longitudinal cross-section of an inductive heating device 1 comprising a housing 2, a rechargeable lithium ion battery 4, control circuitry 6 and an inductor in the form of an induction coil 8. In this example, the battery is a lithium iron phosphate battery having an output or supply voltage of around 3.2 Volts, although it will be appreciated that other types of battery could be used. The control circuitry 6 is connected to the battery 4 and to the induction coil 8 and is configured to control the supply of electrical power from the battery 4 to the induction coil 8. A proximal end of the housing 2 of the inductive heating device 1 has a chamber or cavity 10 for receiving at least a portion of an aerosol-generating article (an example of which is shown in FIG. 2). The induction coil 8 is mounted in the housing 2 surrounding the chamber 10.

FIG. 2 shows an aerosol-generating article 100 for use with the inductive heating device 1 of FIG. 1. The aerosol-generating article 100 comprises a mouthpiece filter 102, a first hollow tube 104, a second hollow tube 106, an aerosol-forming substrate 108 and an end plug 110. Each of the components of the aerosol-generating article 100 is a substantially cylindrical element, each having substantially the same diameter. The components are arranged sequentially in abutting coaxial alignment and are circumscribed by an outer wrapper 112 to form a cylindrical rod.

The aerosol-forming substrate 108 is a tobacco rod or plug comprising a gathered sheet of crimped homogenised tobacco material circumscribed by a wrapper. The crimped sheet of homogenised tobacco material comprises glycerine as an aerosol-former. A conductive susceptor 114 is embedded within the aerosol-forming substrate 108 in intimate physical contact with the homogenised tobacco material. The susceptor 114 extends along substantially the entire length of a central longitudinal axis of the aerosol-forming substrate 108.

The first 104 and second 106 hollow tubes, mouthpiece filter 102 and end plug 110 are all made from cellulose acetate. The end plug 110 is arranged at a distal end 116 of the aerosol-generating article 100 and the mouthpiece filter 102 is arranged at a proximal end of the aerosol-generating article 100. The end plug 110 is provided to prevent contact with the heated susceptor 114 at any time, for example, after use. The first hollow tube 104 may have ventilation holes formed through the thickness of the tube so that air can be drawn in through the ventilation holes to dilute the aerosol generated from the aerosol-forming substrate before the aerosol is drawn into the mouth of a user.

Figure 3:
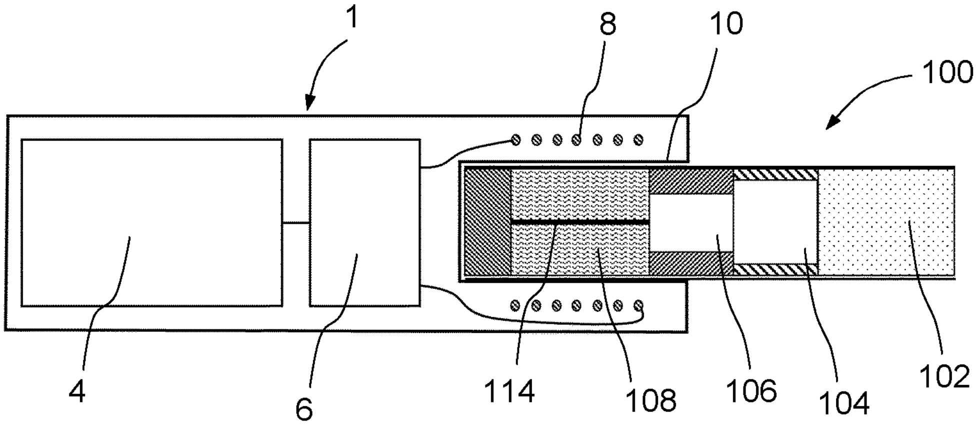
FIG. 3 is a schematic longitudinal cross-section showing the aerosol-generating article of FIG. 2 received in the inductive heating device of FIG. 1.

FIG. 3 shows the aerosol-generating article 100 of FIG. 2 received within the inductive heating device 1 of FIG. 1. The distal end 116 of the aerosol-generating article 100 is inserted into the cavity 10 of the inductive heating device 1 until the end plug 100 abuts the closed end of the cavity 10. In this position, the aerosol-forming substrate 108 is arranged within the induction coil 8 so that the susceptor 114 can be inductively coupled to the varying magnetic field generated by the induction coil during use. A distal portion of the aerosol-generating article 100 extends out of the cavity 10 so that a user may receive the mouthpiece filter 102 between the lips of their mouth.

In use, a user inserts an aerosol-generating article 100 into the cavity 10 of the inductive heating device 1, as shown in FIG. 3. The user then starts a heating cycle by activating the inductive heating device 1, for example, by pressing a switch turning the device on. The inductive heating device 1 activates the induction coil 8 by providing electrical power from the battery 4 to the induction coil 8 via the control circuitry 6. The control circuitry 6 causes an alternating current to pass through the induction coil 8 which causes the induction coil 8 to generate a varying magnetic field. The varying magnetic penetrates the susceptor 114 located within the aerosol-forming substrate 108 and causes it to heat. During a heating cycle, the induction coil 8 heats the susceptor 114 in the article to a predefined temperature, or to a range of predefined temperatures according to a temperature profile. A heating cycle may last for around 6 minutes. The heat from the susceptor 114 is transferred to the aerosol-forming substrate 108 which releases volatile compounds from the aerosol-forming substrate 108. The volatile compounds form an aerosol within an aersolisation chamber formed by the hollow spaces inside the first 104 and second 106 hollow tubes. During a heating cycle, the user places the mouthpiece filter 102 of the aerosol-generating article 100 between the lips of their mouth and takes a puff or inhales on the mouthpiece filter 102. The generated aerosol is then drawn through the mouthpiece filter 102 into the mouth of the user.

It should be noted that FIGS. 1, 2, and 3 are schematic and are not to scale. For clarity, the figures have been simplified by omitting certain irrelevant features and altering the size or number of other features.

Figure 4:
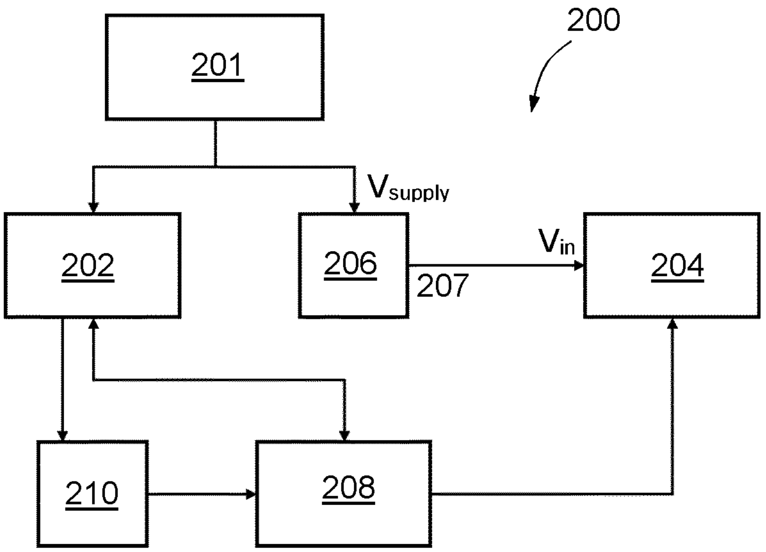
FIG. 4 is a schematic block diagram of control circuitry for an inductive heating device according to an example of the present disclosure.

FIG. 4 is a schematic block diagram showing an example of control circuitry 200 for an inductive heating device connected to a battery 201. The control circuitry 200 comprises a first microcontroller 202 and a heater engine or heater module 204. In the present example, the first microcontroller 202 together with other electronic components and the heater module 204 are mounted on the same printed circuit board (not shown), although it will be appreciated that the heater module 204 could be provided on a separate dedicated printed circuit board.

The first microcontroller 202 is provided for controlling the general operation of the inductive heating device and is connected to various other electronic components to enable it to do this. These various other electronics components have been omitted from FIG. 4 for clarity and to simplify the diagram. For example, such other electronic components may include sensors, a user interface such as LEDs or an LCD screen for displaying information to a user and a switch for activating the inductive heating device, means for providing a data connection with external devices and charging circuitry for recharging the battery of the inductive heating device.

The control circuitry 200 comprises a second microcontroller 208, the purpose of which is to control the heater module 204 and, in particular, the electrical power delivered to the induction coil of the heater module 204, which is inductively coupled to a susceptor in an aerosol-generating article when an aerosol-generating article is received in the inductive heating device (as shown in FIG. 3). For clarity, the second microcontroller 208 has been shown as a separate component in this example, but preferably it is part of the heater module 204 and is dedicated to controlling the heater module 204. In this example, the induction coil is connected to and is part of the heater module 204. The second microcontroller 208 is connected to the first microcontroller 202 and controls the supply of electrical power to the induction coil in response to a signal received from the first microcontroller 202 to initiate a heating cycle. An advantage of the heater module having its own microcontroller is that it helps make the heater module reusable in different devices because it can be programmed with its own firmware for controlling the heating process and there is no need to include firmware relating to heating in other components such as the first microcontroller 202. This helps make the heater module a standalone unit or module which can be integrated into various different devices.

As will be discussed in more detail below in reference to FIG. 5, the heater module 204 comprises drive circuitry (not shown in FIG. 4) for driving the induction coil to heat the susceptor in the aerosol-generating article. The heater module 204 also comprises a DC/AC voltage converter (not shown in FIG. 4) which is connected to the drive circuitry and converts the DC voltage fed to the driving circuitry to an AC voltage in order to generate an alternating current in the induction coil, which in turn causes the induction coil to produce a varying or alternating magnetic field. In this example, the induction coil is part of the DC/AC voltage converter. This arrangement helps to reduce the number of electrical components required. However, it will be appreciated that the induction coil could be separate to the DC/AC voltage converter, although this may necessitate additional components in order to generate an AC voltage. The DC/AC voltage converter also comprises a matching network (not shown in FIG. 4) which is configured to operate at low ohmic load and helps to match the output impedance of the DC/AC converter to the load represented by resistive losses in the induction coil and the apparent or equivalent resistance of the susceptor.

The control circuitry further comprises a DC/DC voltage converter 206 which is configured to convert a DC supply voltage $V_{supply}$ from the battery of the inductive heating device and output a constant voltage of 2.95 Volts at a voltage converter output 207. The voltage converter output 207 is connected to the heater module 204 and provides the voltage input to the heater module 204. Therefore the output voltage from the DC/DC voltage converter 206 constitutes a heater module input voltage Vin. The heater module input voltage Vin is used to power the heater module 204. This heater module input voltage was selected to provide a predetermined heating performance based on the particular components of the heater module. It will be appreciated that different heater module input voltages could be used to provide different heating performance and the DC/DC voltage converter 206 can be configured to output different voltages. However, once the heater module input voltage Vin has been set, significant changes to the heater module input voltage Vin would change the power delivered to the induction coil and may lead to undesirable variation in heating performance. Furthermore, a number of the component parameters of the heater module 204 are sensitive to the input voltage and changing the heater module input voltage Vin may lead to instability. Therefore, the DC/DC voltage converter 206 helps to reduce variability and improve stability by providing a constant heater module input voltage Vin. For clarity, the DC/DC voltage converter 206 has been shown as a separate component in this example, but it may be part of the heater module 204.

Using the control circuitry 200 of FIG. 4 with the inductive heating device 1 of FIG. 1 would convert the DC supply voltage of the lithium iron phosphate battery of 3.2 Volts to a constant heater module input voltage of 2.95 Volts. In this case, the DC/DC voltage converter 206 would help to maintain a constant heater module input voltage but the heater module 204 could function relatively normally with a 3.2 Volt supply from the lithium iron phosphate battery in the absence of the DC/DC voltage converter 206 because this supply voltage is not too dissimilar from the heater module input voltage of 2.95 Volts. However, it will be appreciated that the heater module 204 could be used in different inductive heating devices using batteries having different battery chemistries. For example, the inductive heating device 1 of FIG. 1 could use a lithium nickel manganese cobalt oxide battery having a DC supply voltage of 4.2 Volts. In this case, the DC/DC voltage converter 206 allows the heater module 204 to perform in a similar manner to how the heater module 204 would perform using a lithium iron phosphate battery to supply voltage directly without the DC/DC voltage converter 206 by converting this higher DC supply voltage to 2.95 Volts. Indeed, the DC/DC voltage converter 206 is configured to accept a range of DC supply voltages and output a constant heater module input voltage. Therefore, the DC/DC voltage converter 206 of the heater module 204 allows different types of battery to be used having a range of DC supply voltages.

The control circuitry 200 may also comprise a voltage regulator 210 such as a low dropout regulator to provide a lower voltage, for example 2.5 Volts, for powering logic circuits such as the second microcontroller 208. An advantage of using such low logic voltages is that it helps to reduce the power consumption of the control circuitry 200 and preserve battery life for longer.

Figure 5:
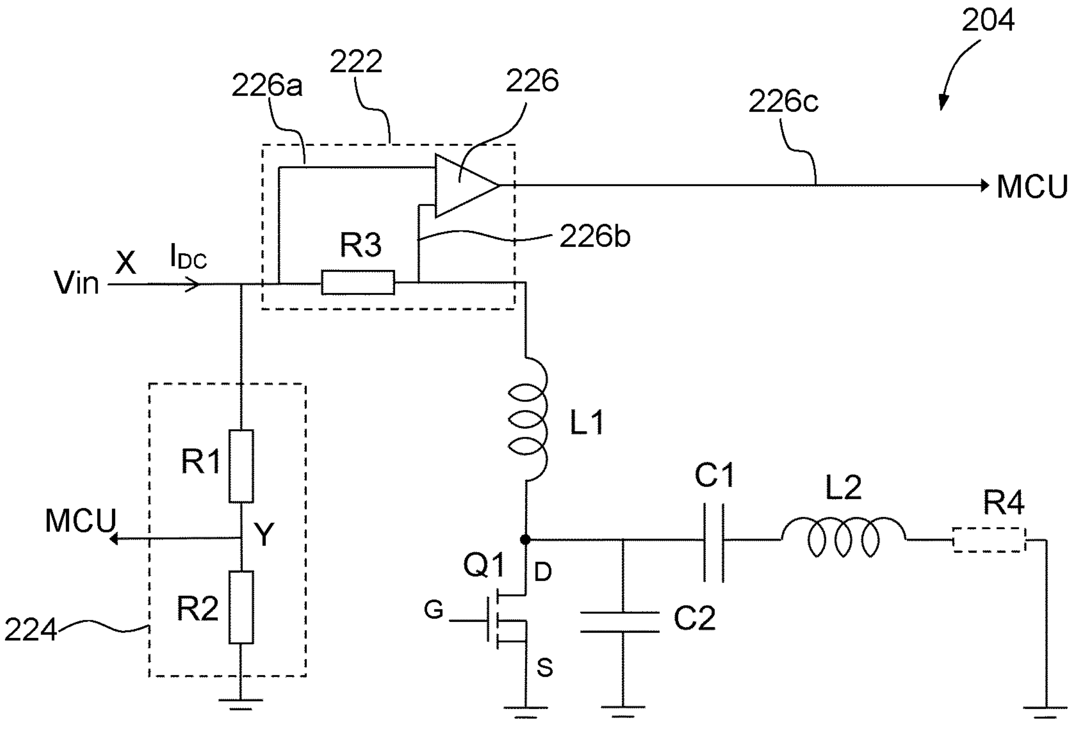
FIG. 5 is a schematic circuit diagram of the heater module of the control circuitry of FIG. 4.

FIG. 5 shows part of the control circuitry 200 of FIG. 4 in more detail, in particular, the heater module 204 of FIG. 4. The circuit of FIG. 5 is powered by the output voltage from the DC/DC voltage converter 206 of FIG. 4, that is, the heater module input voltage Vin, which is received at a point X in FIG. 5. The heater module 204 comprises a transistor switch Q1 and a first inductor L1, which act as drive circuitry for driving the induction heating coil and DC/AC voltage converter. The transistor switch Q1 comprises a field effect transistor (FET), for example, a metal-oxide semiconductor field effect transistor (MOSFET) and the first inductor L1 comprises a radio frequency choke. The heater module input voltage Vin is fed to transistor switch Q1 via resistor R3 (discussed in more detail below) and the first inductor L1. The first inductor L1 helps to reduce radio frequencies which may be present at the input X from entering the circuit. The gate G of the transistor switch Q1 is connected to the second microcontroller 208 of FIG. 4 and receives a switching signal from the second microcontroller 208 to turn transistor switch Q1 ON and OFF. The switching signal is a square wave having a substantially 50% duty cycle.

The heater module 204 further comprises a first capacitor C1 connected in series with a second inductor L2, which corresponds to the induction coil that is inductively coupled to the susceptor in the aerosol-generating article (an example of which is shown in FIG. 2). A second capacitor C2 is connected between the drain D of transistor switch Q1 and electrical ground and acts as a shunt capacitor. The first capacitor C1, second inductor L2 and second capacitor C2 define a DC/AC voltage converter for converting the switching signal passed to the transistor switch Q1 into an AC voltage across a load resistance R4. Resistance R4 represents the total ohmic load connected to the DC/AC voltage converter and is the sum of the ohmic resistance $R_{coil}$ of the second inductor L2 and the apparent ohmic resistance Ra of the susceptor. Resistance R4 is shown in dotted outline in FIG. 5 to indicate that it is an equivalent resistance of the second inductor L2 and the susceptor rather than an actual resistor in the circuit. Resistance R4 is equivalent to the ohmic resistance $R_{coil}$ of the second inductor L2 connected in series with the apparent ohmic resistance Ra of the susceptor.

Together, the first inductor L1, transistor switch Q1, first capacitor C1, second inductor L2 and second capacitor C2 form a Class-E power amplifier. The general operating principle of the Class-E power amplifier is known and is described in detail in the article "Class-E RF Power Amplifiers", Nathan O. Sokal, published in the bimonthly magazine QEX, edition January/February 2001, pages 9-20, of the American Radio Relay League (ARRL), Newington, CT, U.S.A. and therefore will not be discussed further here.

It has been found that using a Class-E amplifier to power the second inductor L2 is highly efficient. This is because, due to the configuration of the circuit, current flow through transistor switch Q1 does not occur at the same time as there is voltage across the transistor switch Q1. Accordingly, substantially no energy is dissipated in transistor switch Q1 and instead substantially all the power is fed to the load R4. Furthermore, the first capacitor C1 and second inductor L2 form a series resonant circuit which is tuned to the switching frequency of the switching signal. The first capacitor C1 and second inductor L2 act as a bandpass filter which allows an AC voltage signal to be transferred to the load R4 only at the desired operating frequency of the second inductor L2. This means that power is transferred to the load R4 only at the switching frequency of the switching signal and any harmonic frequencies are significantly suppressed, which helps to further improve efficiency.

In addition, the second inductor L2 and capacitors C1 and C2 form an LC load network or matching network which is configured to operate at low ohmic load and helps to match the output impedance of the DC/AC converter to the load resistance R4. In particular, the capacitors C1 and C2 have been tuned to reduce the ohmic load of the second inductor L2 relative to the susceptor so that more heat is dissipated in the susceptor compared to the inductor L2, which is what is desired for heating the aerosol-forming substrate.

The heater module 204 comprises relatively few components compared to other power electronics circuits for inductive heating devices and therefore the printed circuit board area required for mounting these components can be kept small, which helps to reduce the overall dimensions of the inductive heating device. Furthermore, by using the second inductor L2 in the DC/AC conversion, the number of components is further reduced.

During operation of the inductive heating device, the second inductor L2 generates a high frequency alternating magnetic field that induces eddy currents in the susceptor of the aerosol-generating article (an example of which is shown in FIG. 2). As the susceptor of the aerosol-generating article is heated during operation, the apparent resistance Ra of the susceptor increases as the temperature of the susceptor increases. This increase in the apparent resistance Ra is remotely detected by the control circuitry of the heater module 204 through measurements of the DC current drawn by the heater module, as discussed in more detail below. The DC current drawn by the heater module 204 at constant voltage decreases as the temperature and apparent resistance Ra of the susceptor increases.

The circuit of FIG. 5 further comprises two sensor circuits for determining the apparent resistance Ra or conductance G of the susceptor: current sensor circuit 222 and voltage sensor circuit 224. The current sensor circuit 222 comprises a current sensor in the form of resistor R3 which has a known value. The resistor R3 is connected in series between point X (which receives the heater module input voltage Vin) and the first inductor L1. Therefore, during operation, the DC current $I_{DC}$ passing through resistor R3 is substantially the same as the current being drawn by the heater module 204. As discussed above, the circuit of FIG. 5 is powered by the output voltage from the DC/DC voltage converter 206 of FIG. 4. Therefore, the DC current $I_{DC}$ passing through resistor R3 is equal to the DC current supplied by the DC/DC voltage converter. Resistor R3 has an appropriately low resistance value to help to reduce resistive losses.

The current sensor circuit 222 further comprises a differential amplifier 226 having two inputs 226*a* and 226*b* which are connected at either side of the resistor R3 and therefore receives voltage signals from either side of the resistor R3. The differential amplifier 226 has an output 226*c* which outputs a voltage that is proportional to the difference between the voltages received at its inputs 226*a* and 226*b*, that is, the voltage drop $V_{R3}$ across resistor R3. The output 226*c* of differential amplifier 226 is connected to an analogue-to-digital converter (ADC) input of a microcontroller (MCU), that is, the second microcontroller 208 of FIG. 4. Therefore, based on the signal received from the output 226*c* of differential amplifier 226, the microcontroller 208 is able to determine the voltage drop $V_{R3}$ across resistor R3. Since the resistor R3 has a known value, the DC current $I_{DC}$ through resistor R3 which is fed to the heater module 204 can be determined by the second microcontroller 208 through a simply application of Ohm's law as shown in equation (1):

$$I_{DC}=V_{R3}/R3 \qquad (1)$$

The voltage sensor circuit 224 comprises a first resistor R1 and a second resistor R2 connected in series between point X in FIG. 5, where the heater module input voltage Vin is received, and electrical ground. Resistors R1 and R2 form a voltage or potential divider and have equal resistance values so that the voltage at a point Y between resistors R1 and R2 is equal to half the heater module input voltage Vin. Point Y is connected to an analogue-to-digital converter (ADC) input of a microcontroller (MCU), that is, the second microcontroller 208 of FIG. 4, to provide a voltage signal corresponding to the voltage at point Y to the second microcontroller 208. This allows the second microcontroller 208 to determine the heater module input voltage Vin by simply multiplying the voltage signal received from point Y by two. It will be appreciated that other resistance values could be used for resistors R1 and R2 but that this would involve a corresponding adjustment to the voltage calculation performed by the microcontroller. Resistors R1 and R2 have relatively high resistance values to reduce current draw through the potential divider.

The voltage sensor circuit 224 is optional because, as mentioned above, the heater module input voltage Vin corresponds to the constant voltage output from the DC/DC voltage converter 206 in FIG. 4. Therefore, the heater module input voltage Vin is already known and is constant and therefore can be stored as a value in the memory of the second microcontroller 208 or the first microcontroller 202. However, the provision of the voltage sensor circuit 224 allows the heater module input voltage Vin to be checked to confirm it is the same as the one stored in memory. Furthermore, the provision of the voltage sensor circuit 224 actually negates the need to store the heater module input voltage Vin in memory thereby simplifying the programming of the second microcontroller 208 or the first microcontroller 202.

As mentioned above, a Class-E power amplifier has been found to be a highly efficient means for transferring power to the load resistance R4, which, as discussed above, corresponds to the ohmic resistance $R_{coil}$ of the second inductor L2 in series with the apparent ohmic resistance Ra of the susceptor (not shown). Consequently, the DC current $I_{DC}$ through resistor R3 is indicative of the current being supplied to the load resistance R4. Furthermore, the resistance value of resistor R3 is relatively small and therefore the voltage drop across resistor R3 can be substantially ignored. Therefore, the value of the load resistance R4 can be determined by the second microcontroller 208 by another simply application of Ohm's law as shown in equation (2):

$$R4=Vin/I_{DC} \quad (2)$$

Equation (2) above can be rewritten as shown in equation (3) below to give the conductance G of the load resistance R4:

$$G=I_{DC}/Vin \quad (3)$$

Conductance G is simply the reciprocal of resistance R4. An advantage of determining conductance G in accordance with equation (3) is that conductance is indicative or directly related to DC current $I_{DC}$ when voltage Vin is constant, which it is in this case because Vin is provided by the DC/DC voltage converter 206 of FIG. 4. Therefore, the current being supplied by the DC/DC voltage converter and being measured by the current sensor circuit 222 provides a direct indication of the conductance of the susceptor. Consequently, the value of DC current $I_{DC}$ determined above can be used by the second microcontroller 208 as a proxy for the value of conductance G without actually having to determine conductance G or resistance R4 thereby reducing and simplifying the calculations which need to be performed.

The apparent ohmic resistance Ra of the susceptor can be determined by the second microcontroller 208 by subtracting the ohmic resistance $R_{coil}$ of the second inductor L2 from the value of load resistance R4 as shown in equation (4):

$$Ra=R4-R_{coil} \quad (4)$$

As mentioned above, the temperature of the susceptor (not shown) is related to its apparent ohmic resistance Ra or its conductance G. Therefore, determining the apparent ohmic resistance Ra or conductance G of the susceptor allows the temperature of the susceptor to be determined by the second microcontroller 208, for example, using a known relationship between resistance Ra or conductance G and susceptor temperature. Alternatively, a look-up table could be used. Determining the apparent ohmic resistance Ra or conductance G of the susceptor also allows the temperature of the susceptor to be controlled by controlling the amount of power supplied to the second inductor L2. The temperature of the susceptor needs to be carefully controlled in order ensure that volatile components are vaporised from the aerosol-forming substrate of the aerosol-generating article without burning or pyrolytic degradation of the aerosol-forming substrate. To do this, the second microcontroller 208 of FIG. 4 monitors the temperature of the susceptor using the method described above. When the temperature of the susceptor equals or exceeds a desired temperature for heating the aerosol-forming substrate, the second microcontroller interrupts or turns OFF the supply of power to the second inductor L2. When the temperature of the susceptor falls below a desired temperature for heating the aerosol-forming substrate, the second microcontroller turns ON the supply of power to the second inductor L2. The second microcontroller 208 therefore implements an ON/OFF controller for controlling the temperature of the susceptor. However, it will be appreciated that other control schemes could be used such as proportional-integral-derivative (PID) control.

Figure 6:
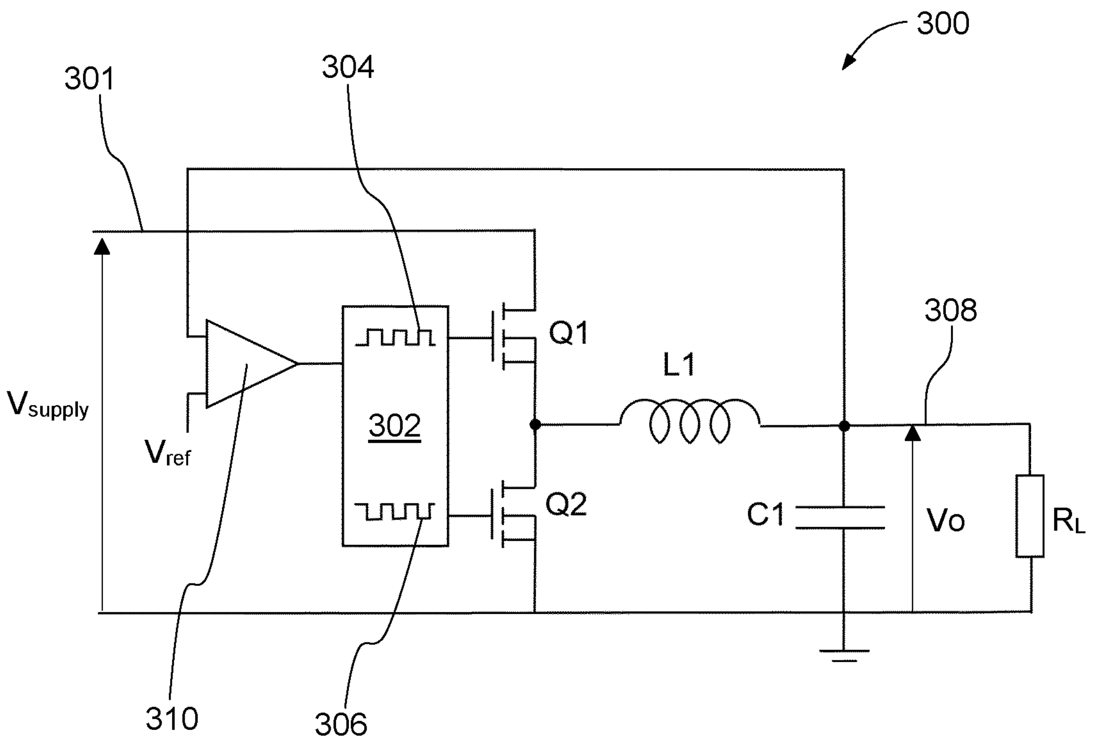
FIG. 6 is a schematic circuit diagram of a DC/DC voltage converter for use in an inductive heating device according to an example of the present disclosure.

FIG. 6 shows a schematic circuit diagram of a DC/DC voltage converter 300 for use in an inductive heating device. The DC/DC voltage converter 300 has an input 301 for receiving a DC supply voltage $V_{supply}$ from a battery or other voltage source. The DC/DC voltage converter 300 is configured to convert the DC supply voltage $V_{supply}$ to a constant output voltage Vo at an output 308 of the DC/DC voltage converter 300. The output voltage Vo can be used to power a heater module and therefore is substantially equal to the heater module input voltage Vin used to power the heater module 204 in FIG. 5. In FIG. 6 the components of the heater module are represented by load resistance $R_L$ connected between the output 308 and electrical ground. The DC/DC voltage converter 300 can receive a range of different DC supply voltages from different batteries having different battery chemistries.

The DC/DC voltage converter 300 comprises a controller 302 which is connected to a first switching element Q1 and a second switching element Q2 which are both metal oxide semiconductor field effect transistors. The controller 302 is configured to generate a first switching signal 304 and output this first switching signal 304 to the first switching element Q1 to turn the first switching element Q1 ON and OFF. The first switching signal 304 is pulse width modulated having a controllable duty cycle, that is, the proportion of a period of a single cycle of the switching signal that the signal is ON or high. The controller 302 is also configured to generate a second switching signal 306 and output this second switching signal 306 to the second switching element Q2 to turn the second switching element Q2 ON and OFF. The second switching signal 306 is an inverted version of the first switching signal 304 so that when the first switching element Q1 is turned ON, the second switching element Q2 is switched OFF and vice versa. Therefore, the controller 302 prevents the first switching element Q1 from being turned ON at the same time as the second switching element Q2 is turned on and shorting the supply voltage $V_{supply}$ to electrical ground.

The DC/DC voltage converter 300 further comprises an inductor L1. A first side of the inductor L1 is connected to a point between the first Q1 and second Q2 switching elements and a second side of the inductor L1 is connected to an output 308 of the DC/DC voltage converter 300. The first Q1 and second Q2 switching elements are arranged in a half-bridge arrangement with the first side of the inductor L1 being connected to a mid-point of the bridge. A capacitor C1 is arranged between the output 308 and electrical ground.

When the first switching element Q1 is turned ON or activated, the DC supply voltage $V_{supply}$ causes current to flow through the inductor L1 to the load $R_L$ connected at the output 308 and charges capacitor C1. As a changing current flows through the inductor L1, it produces a voltage which opposes the flow of current, until it reaches a steady state creating a magnetic field around the inductor L1. This situation continues as long as the first switching element is turned ON. Current cannot flow through the second switching element Q2 during this time because it is switched OFF.

When the first switching element Q1 is turned OFF, the DC voltage supply $V_{supply}$ IS disconnected from the inductor L1 causing the magnetic field around the inductor L1 to collapse inducing a reverse voltage across the inductor L1. This reverse voltage causes the current generated by the collapsing magnetic field to continue to flow through the load $R_L$ in the same direction that current flowed when first switching element Q1 was ON, and to return back through the second switching element Q2, which is now turned ON or activated. During this time, capacitor C1 also discharges and supplies current to the load $R_L$ which smooths any ripple in the output voltage created by the switching action of the first Q1 and second Q2 switching elements. Electrical current through the inductor L1 always flows in the same direction so that a DC voltage is generated at the output 308.

As the first switching element Q1 is being continuously turned ON and OFF, the average output voltage value seen at the output 308 will be related to the duty cycle, which is related to the percentage time the first switching element Q1 is turned ON during one full switching cycle. Therefore, the output voltage Vo from the DC/DC voltage converter 300 can be determined from equation (5):

$$Vo = \text{duty cycle} \times V_{supply} \quad (5)$$

For example, a duty cycle of 50 percent will produce an output voltage Vo which is 50 percent or half of the DC supply voltage $V_{supply}$ and a duty cycle of 25 percent will produce an output voltage Vo which is 25 percent or a quarter of the DC supply voltage $V_{supply}$.

With no load connected to the voltage converter, maintaining a constant duty cycle will maintain a constant output voltage Vo. However, fluctuations in the load current through load $R_L$ will cause the output voltage Vo at the output 308 to change to some extent. Therefore, to counteract this, the DC/DC voltage converter 300 comprises a comparator 310 which compares the output voltage Vo to a reference voltage $V_{ref}$, and outputs a signal for adjusting the duty cycle of the first switching signal 304 to compensate for any fluctuations in output voltage Vo. The reference voltage $V_{ref}$ is indicative of the desired output voltage Vo. If the output voltage Vo is less than the reference voltage $V_{ref}$, then the comparator 310 will output a signal to increase the duty cycle and vice versa. The output 308 of the DC/DC voltage converter 300 is connected to one input of the comparator and the other input of the comparator 310 is connected to the reference voltage $V_{ref}$. The output of the comparator is connected to the controller 302 which receives the output signal from the comparator 310 and adjusts the duty cycle of the first switching signal 304 accordingly.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5 percent (5%) of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. An inductive heating system, comprising:

a first inductive heating device comprising:

a first DC power supply configured to provide a first DC supply voltage, and a first heater module comprising an inductor configured to provide inductive heating, the first heater module having a first heater module input voltage that is substantially equal to the first DC supply voltage; and a second inductive heating device comprising:

a second DC power supply configured to provide a second DC supply voltage that is different from the first DC supply voltage, a second heater module comprising an inductor configured to provide inductive heating, the heater module having the first heater module input voltage, and a DC/DC voltage converter configured to convert the second DC supply voltage to the first heater module input voltage.

2. The inductive heating system according to claim 1, wherein the DC/DC voltage converter is part of the second heater module.

3. The inductive heating system according to claim 1, wherein the first heater module input voltage is less than the second DC supply voltage and the DC/DC voltage converter is a step-down voltage converter.

4. The inductive heating system according to claim 1, wherein the DC/DC voltage converter is configured to accept a range of DC supply voltages and output a constant first heater module input voltage.

5. The inductive heating system according to claim 1, wherein an output voltage of the DC/DC voltage converter is related to a duty cycle of a switching signal generated or received by the DC/DC voltage converter.

6. The inductive heating system according to claim 5, wherein the DC/DC voltage converter comprises a first switching element configured to be activated during a first part of the switching signal.

7. The inductive heating system according to claim 6, wherein the DC/DC voltage converter comprises a second switching element which is configured to be activated during a second part of the switching signal.

8. The inductive heating system according to claim 7, wherein the second switching element is deactivated when the first switching element is activated, and the first switching element is deactivated when the second switching element is activated.

9. The inductive heating system according to claim 7, wherein the first and the second switching elements are arranged in a half-bridge arrangement.

10. The inductive heating system according to claim 5, wherein the DC/DC voltage converter comprises a comparator configured to compare an output voltage of the DC/DC voltage converter to a reference voltage and to generate an output signal for adjusting a duty cycle of the switching signal based on the comparison.

11. The inductive heating system according to claim 1,
- wherein the first and the second inductive heating devices are configured to heat an aerosol-forming substrate using a susceptor, and
- wherein the inductor in each of the first and the second inductive heating devices is arranged to inductively couple to its respective susceptor.

12. The inductive heating system according to claim 11, wherein the first and the second inductive heating devices are further configured to determine a temperature of their respective susceptor by determining a resistance or a conductance of their respective susceptor based on a measured current supplied by the first and the second DC power supplies respectively or by the DC/DC voltage converter.

13. The inductive heating system according to claim 12, wherein the first and the second inductive heating devices further comprise a DC current sensor configured to measure a current supplied by the first and the second DC power supplies, respectively.

14. The inductive heating system according to claim 1, wherein the first and the second inductive heating devices further comprise a DC/AC voltage converter comprising or connected to their respective inductor and configured to convert the first heater module input voltage to an AC voltage for driving the inductor.

15. The inductive heating system according to claim 14, wherein the first and the second inductive heating devices are further configured to interrupt generation of the AC voltage when a determined temperature of a susceptor exceeds or equals a predetermined threshold value.

* * * * *